July 29, 1930.    O. CULLMAN    1,771,432

COMBINED SPROCKET AND PINION

Filed Oct. 15, 1928

Inventor
Otto Cullman

By: Charles Turner Brown,
Att'y.

Patented July 29, 1930

1,771,432

UNITED STATES PATENT OFFICE

OTTO CULLMAN, OF CHICAGO, ILLINOIS

COMBINED SPROCKET AND PINION

Application filed October 15, 1928. Serial No. 312,568.

This invention relates to the manner of joining a sprocket wheel to the pinion and shaft of a unit consisting of a pinion integral with a shaft, so that said sprocket and pinion will rotate in unison, and be rigidly connected.

Among the objects of the invention is to join the sprocket to the pinion in such a manner that they can be readily disconnected; while at the same time, they will be rigidly joined, with no liability to become accidentally separated and an additional object is to obtain means for effecting the joining of the sprocket and the pinion which is not expensive and which is durable.

In the drawing which illustrates the construction of an embodiment of the invention.

Figure 1:
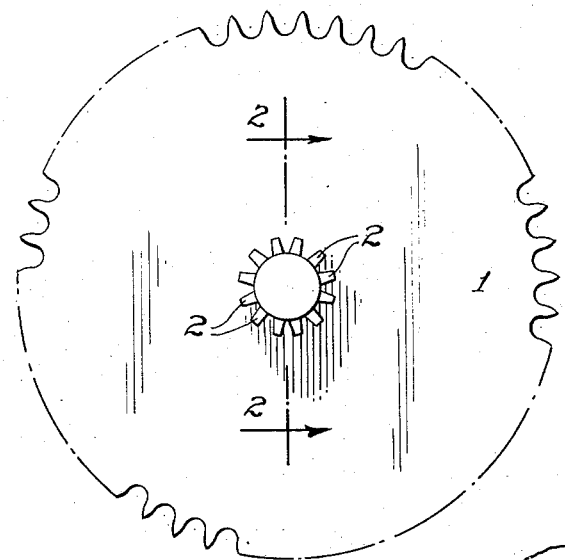
Fig. 1 illustrates a sprocket wheel mounted on a pinion and shaft, with the retaining means not in position thereon, the sprocket wheel being in front elevation and the pinion and shaft in end elevation.
Figure 3:
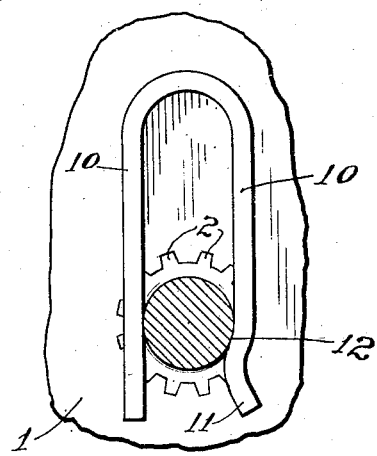
Fig. 3 is a front elevation of a portion of the sprocket wheel and the retaining means, showing the shaft in vertical section, viewed on line 3—3 of Fig. 2, as indicated by arrows.

A reference numeral applied to designate a given part indicates said part throughout the several figures of the drawing wherever the same appears.

1 represents a sprocket wheel and 2 the peripheral lines of a central aperture through wheel 1. Peripheral lines 2 of the central aperture in sprocket wheel 1 correspond with the portion of the pinion, (3) which enters said central aperture when the sprocket wheel is mounted on the pinion. 3 represents a pinion and 4 a shaft which is integral with said pinion. 5 represents a groove around shaft 4, adjacent to the pinion 3, and 6 a bevelled side to groove 5. 7 represents the portion of the pinion 3 which enters the central aperture of sprocket wheel 1. It will be observed that the ends of the teeth of the pinion 3 which enters the central aperture of the sprocket wheel are removed to obtain shoulder 8, against which the side of the sprocket wheel 1 is forced by the retaining means, (9) about to be described. 10 represents a U-shaped spring member which forms the means for retaining the sprocket wheel in place on the pinion. To facilitate the placing of the retaining means in position to secure the sprocket wheel on the pinion, one end of one of the parallel members of retaining means 10 is curved outward, as at 11, and to hold said retaining means in place after it is properly mounted on the shaft 4, it is curved inwards, as at 12, adjacent to the outward bend 11.

To assemble the several parts the sprocket wheel 1 is mounted on pinion 3, with the side of the sprocket wheel in contact with shoulders 8, and the retaining means is forced into place on shaft 4, in groove 5. As the retaining means is forced into place in groove 5, the ends of the parallel members of said retaining means are forced apart, and as said retaining means is forced to its final position said ends of the retaining means partially return to their normal position, by the resiliency of the retaining means, the curved portion 12 permitting said partial return. Because of this partial return of the ends of the retaining member to normal position it is held rigidly in place, thereby holding the sprocket wheel in place on the pinion. The teeth of the pinion fitting closely to the aperture in the sprocket wheel serve as so many keys to cause the sprocket wheel and pinion to turn in unison.

Figure 2:
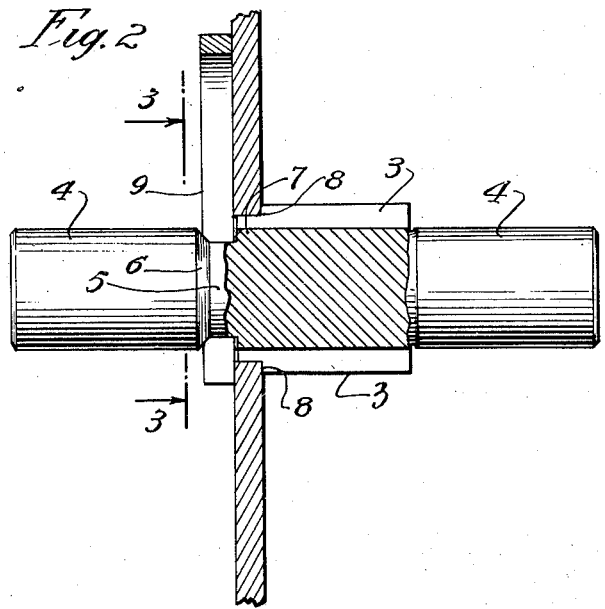
Fig. 2 is a vertical section of the pinion, the retaining means, and a portion of the sprocket wheel, showing the shaft in side elevation; end line 2—2 of Fig. 1, viewed as indicated by arrows.

I have made the central aperture 2 in sprocket wheel 1, to conform to the teeth of pinion 3, without removal of the ends of said teeth, making said aperture fit so closely on the teeth of the pinion as to require it to be forced thereon, thus avoiding removal of a portion of the teeth to obtain shoulder 8, (Fig. 2); but I prefer to remove a portion of said teeth, as thereby a sufficiently close fit of the sprocket wheel on the pinion is obtained which can be readily separated therefrom and a different size of sprocket wheel joined thereto, and at all times the sprocket wheel and pinion are rigidly joined.

I claim:

1. A shaft, a gear pinion integral with said shaft, portions of the teeth at one end of said pinion removed to obtain shoulders, in combination with a sprocket wheel provided with a central aperture conforming to the teeth portions of which are removed, and removable means to hold said sprocket wheel on said partially removed teeth in contact with said shoulders.

2. A shaft, a gear pinion integral with said shaft, and with a groove adjacent to said pinion, portions of the teeth of said pinion adjacent to said groove removed to obtain shoulders, in combination with a sprocket wheel provided with a central aperture conforming to the teeth portions of which are removed, and a U-shaped member of resilient material, one end of one of the parallel elements of said member curved outwardly, and said element curved inwardly adjacent to said outward curve, said U-shaped member adapted to be forced on to said shaft in said groove, with said inward curve engaging said shaft to maintain said U-shaped member on said shaft.

3. A shaft, a gear pinion integral with said shaft, said shaft provided with a groove adjacent to said pinion, one of the sides of said groove bevelled and portions of the teeth of said pinion adjacent to said groove removed to obtain shoulders, in combination with a sprocket wheel provided with a central aperture conforming to the partially removed teeth of said pinion, and a U-shaped member of resilient material, one end of one of the parallel elements of said member curved outwardly and said element curved inwardly adjacent to said outward curve, said U-shaped member adapted to be forced on to said shaft in said groove, with said inward curve engaging said shaft, to maintain said sprocket wheel against said shoulders.

4. A shaft provided with a gear pinion integral therewith and with a groove around it adjacent to said pinion, in combination with a sprocket wheel provided with a central aperture conforming with the teeth of said pinion, and means comprising a U-shaped member of resilient material adapted to be forced on to said shaft and in said groove, to maintain said sprocket wheel on said pinion.

OTTO CULLMAN.